United States Patent
Fenn et al.

(10) Patent No.: US 6,482,474 B1
(45) Date of Patent: Nov. 19, 2002

(54) COATING COMPOSITION

(75) Inventors: David Robert Fenn, Buckinghamshire (GB); Peter Kwok Hing Lam, Frederiksberg (DK)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

(21) Appl. No.: 09/868,803

(22) PCT Filed: Dec. 23, 1999

(86) PCT No.: PCT/GB99/04422

§ 371 (c)(1),
(2), (4) Date: Jun. 21, 2001

(87) PCT Pub. No.: WO00/39184

PCT Pub. Date: Jul. 6, 2000

(30) Foreign Application Priority Data

Dec. 24, 1998 (GB) .............................................. 9828444

(51) Int. Cl.⁷ ................................................. B05D 3/00
(52) U.S. Cl. .................................................... 427/385.5
(58) Field of Search ....................................... 427/385.5

(56) References Cited

U.S. PATENT DOCUMENTS 4,273,912 A  6/1981  Harmer ....................... 528/67

5,212,216 A  *  5/1993  Hattori et al.

FOREIGN PATENT DOCUMENTS

| DE | 2732182 | 1/1978 |
|----|---------|--------|
| GB | 2187196 | 9/1987 |
| JP | 62-169864 | 7/1987 |
| JP | 63-64739 | 3/1988 |
| JP | 9-31412 | 2/1997 |

OTHER PUBLICATIONS

Chemical Abstracts, vol. 109, No. 10, Sep. 1988, Abstract No. 75425v (JP 63–64739), entitled "Colored Polyurethane Elastomer–coated Anticorrosive Heavy Duty Steels".

English language abstract for JP 62–169864 Jul. 1987.

English language abstract for JP 9–31412. Feb. 1997.

* cited by examiner

Primary Examiner—Erma Cameron
(74) Attorney, Agent, or Firm—Jacques B. Miles

(57) ABSTRACT

A coating composition comprising a solution in a volatile organic solvent of: i) a polyisocyanate, ii) a hydroxyl functional polymer, the polyisocyanate comprising a mixture of an aliphatic polyisocyanate having an average isocyanate functionality of 2.5 or more, and diphenylmethane diisocyanate.

17 Claims, No Drawings

COATING COMPOSITION

REFERENCE TO RELATED APPLICATIONS

This patent application claims priority of GB 9828444.1 filed on Dec. 24, 1998, which was also filed as PCT Application No. PCT/GB99/04422 on Dec. 23, 1999, designating the United States of America.

FIELD OF THE INVENTION

This invention relates to polyurethane coating compositions, their preparation and use.

BACKGROUND

Coatings used for the repair painting of motor vehicles generally comprises several layers of different coating compositions. The initial coating is usually a primer coating. The primer coating provides adhesion to the substrate, which can be bare metal or can be existing primer or topcoat or a mixture of these depending on the nature of the repair. The primer is also formulated so as to provide a relatively thick layer of coating which can be sanded (also known as 'flatted') using sand- or glasspaper so as to obliterate minor imperfections in the substrate and so provide a perfectly flat surface for subsequent layers of coating. Over the primer, a topcoat is applied which itself can comprise more than one type of coating such as a basecoat and a clearcoat.

One class of coating compositions which is well known for use in primers comprises a hydroxyl functional polymer, such as a polyester or acrylic polymer, and a polyisocyanate. These two components react together after application to the substrate to form a polyurethane coating. These compositions are often thus referred to as 'polyurethane coating compositions' although strictly the polyurethane is only formed when the coating crosslinks. Polyurethane primers of this general type have been known for at least 20 years.

Examples of prior art polyurethane coating compositions are disclosed in U.S. Pat. No. 4,273,912; Chem Abs. 109 (10), 1988; WPI database, week 9012, XP-002094192; GB2187196 and WPI database, week 9715, XP-002094193. None of these documents however discloses the use of a coating composition comprising a solution in a volatile organic solvent of a hydroxy functional polymer and polyisocyanate comprising a mixture of an aliphatic polyisocyanate having an average isocyanate functionality of 2.5 or more, and diphenylmethyl diisocyanate.

One problem which we have found with using polyurethane primers is that when they are sanded down in a particular spot, they tend to chip around the edge of the primer coating, where it meets bare metal or existing paint rather than producing a smooth edge. Although small, this chipping is sufficient to present a noticeable defect in the final topcoat and is unacceptable in producing high quality spot repairs on cars. We have now discovered a solution to this chipping problem by using primer compositions which contain an aliphatic polyisocyanate having an average isocyanate functionality of 2.5 or more, and a hydroxyl functional polymer, in which the polyisocyanate comprises a proportion of diphenylmethane diisocyanate, also known as MDI

SUMMARY OF THE INVENTION

According to the present invention there is provided coating composition comprising a solution in a volatile organic solvent of;
i) A polyisocyanate, and
ii) a hydroxyl functional polymer,
the polyisocyanate comprising a mixture of an aliphatic polyisocyanate having an average isocyanate functionality of 2.5 or more, and diphenylmethane diisocyanate.

DETAILED DESCRIPTION OF THE INVENTION

The volatile organic solvent can be any solvent which will dissolve the polyisocyanate, and the hydroxyl functional polymer. It can be an aliphatic or aromatic hydrocarbon such as Solvesso 100™, toluene or xylene, an alcohol such as butanol or isopropanol, an ester such as butyl acetate or ethyl acetate, a ketone such as acetone, methyl isobutyl ketone or methyl ethyl ketone, an ether, an ether-alcohol or an ether-ester or a mixture of any of these.

Preferably the compositions contain less than 500 g/l of volatile organic solvent based on the total composition, more preferably less than 480 g/l still more preferably less than 420 g/l and most preferably less than 250 g/l.

Polyisocyanates are compounds having two or more isocyanate groups per molecule. Aliphatic polyisocyanates are well known in the coatings art. The isocyanate groups can be blocked but unblocked isocyanates are preferred.

The aliphatic polyisocyanate has an average isocyanate functionality of 2.5 or more isocyanate groups per molecule. Suitable polyisocyanates include the isocyanurate trimers and allophanates of aliphatic diisocyanates as well as the reaction products of these diisocyanates with polyols. Examples of aliphatic diisocyanates include tetramethylxylene diisocyanate, hexamethylene diisocyanate and isophorone diisocyanate. Polyols are compounds having three or more hydroxyl groups. Suitable polyols include trimethylol propane, glycerol and pentaerythritol. Many such aliphatic polyisocyanates are commercially available, for example under the Desmodur trade mark from Bayer or the Tolonate trade mark from Rhodia.

Diphenylmethane diisocyanate (MDI) is generally sold as a mixture of two isomers, 4,4'- and 2,4-diphenylmethane diisocyanate. MDI is commercially available, for example as Suprasec MDI and MDI-based prepolymers from ICI Polyurethanes. Preferably the polyisocyanate comprises 1 to 99% by weight of MDI, more preferably 1 to 500% and most preferably 20 to 50%.

Polyisocyanates are preferably used in an amount such that the ratio of isocyanate groups on the polyisocyanate to the total number of hydroxyl groups on the hydroxyl functional polymer is in the range 0.7:1 to 3:1, more preferably 1:1 to 3:1.

The hydroxyl functional polymer can be any conventional hydroxyl functional film-forming polymer (including oligomers) known in the coatings art. Preferably the hydroxyl functional polymer has a hydroxyl value of 5 to 500, more preferably 50 to 250.

Conventional film forming polymers include acrylic addition polymers, epoxy polymers, alkyd polymers, polyether polymers or polyester polymers. Preferred hydroxyl functional polymers are polyesters and acrylic addition polymers.

Hydroxyl functional acrylic addition polymers are derived from polymerisable ethylenically unsaturated monomers such as vinyl or acrylic monomers and comprise functional units and structural units. Whenever referred to herein, the term acrylic monomer refers to esters of acrylic or methacrylic acid. The term (meth) acrylate refers to both the acrylate and methacrylate equally and the term (meth) acrylic acid refers to acrylic or methacrylic acid equally.

Functional units are derived from hydroxyl functional vinyl or acrylic monomers. An example of a hydroxyl functional vinyl monomer is vinyl alcohol. Examples of hydroxyl functional acrylic monomers are hydroxy ethyl (meth) acrylate, hydroxy butyl (meth) acrylate and hydroxy propyl (meth) acrylate.

Other examples of suitable hydroxyl functional monomers are the reaction products of glycidyl (meth) acrylate with monocarboxylic acids, such as versatic acid and the reaction product of (meth) acrylic acid with monoepoxy compounds such as Cardura E™ (the glycidyl ester of versatic acid; from Shell).

Structural units are derived from monomers which do not have any functional groups which will react with the crosslinker. Examples of monomers which do not have any functional group which will react with the crosslinker are non-functional vinyl monomers and alkyl esters of (meth) acrylic acid.

Examples of suitable non-functional vinyl monomers are styrene and tertiary butyl styrene, preferably tertiary butyl styrene. Examples of suitable alkyl esters of (meth) acrylic acid are $C_{1-12}$ alkyl esters such as methyl (meth) acrylate, ethyl (meth) acrylate, n-butyl (meth) acrylate, t-butyl (meth) acrylate, n-propyl (meth) acrylate and isobornyl (meth) acrylate.

It is also possible to include certain monomers which carry groups other than hydroxyl groups, such as carboxylic acid groups, amine groups and epoxy groups. An example of a monomer carrying a carboxylic acid group is (meth) acrylic acid An example of a monomer carrying an amine groups is tertiary-butyl aminoethyl (meth) acrylate. An example of a monomer carrying a glycidyl group is glycidyl (meth) acrylate.

It is also possible to react certain functional groups with other compound so as to modify the polymer. For example, acid groups on the polymer can be reacted with glycidyl functional compounds such as the glycidyl ester of versatic acid (Cardura E™ from Shell) and epoxy groups on the polymer can be reacted with an acid functional compound, for example versatic acid.

Preferred acrylic addition polymers have a number average molecular weight as measured by gel permeation chromatography of 700 to 10000, more preferably 1000 to 4000.

Preferred acrylic addition polymers have a theoretical glass transition temperature (Fox Tg) of 0 to 80° C., more preferably 20 to 70° C.

When the hydroxyl functional polymer is an acrylic addition polymer it can be produced by contacting a mixture of the appropriate monomers with a polymerisation initiator at a temperature at which polymerisation occurs. For example the monomer mixture can be slowly fed into a solution of initiator held at the polymerisation temperature or the initiator can be fed into a solvent at the polymerisation temperature simultaneously with the monomer mixture.

Suitable initiators are azo initiators such as 2,2' azobis (2-methylbutyronitrile) or peroxy initiators such as benzoyl peroxide.

Suitable polyesters are derived from a polybasic acid and a polyhydroxy compound. Polybasic acids are compounds having two or more carboxylic acid groups or an equivalent number of anhydride groups (on the basis that one anhydride group is equivalent to two acid groups). Such polybasic acids are well known in the polyester art. Examples of suitable polybasic acids are $C_{1-6}$ alkane dioic acids such as adipic acid or hexanedioic acid, cycloaliphatic acids such as hexahydrophthalic acid, unsaturated alkane dioic acids such as fumaric or maleic acids, dimer acids, and aromatic acids such as phthalic acid. Their equivalent anhydrides such as maleic anhydride or phthalic anhydride can also be used. Preferably the polybasic acids are saturated.

Polyhydroxy compounds are compounds having two or more hydroxyl groups and are well known in the polyester art. Examples of suitable polyhydroxy compounds are trimethylol propane, glycerol, neopentyl glycol and pentaerythritol.

Preferably the polyester has a hydroxyl value of 50 to 300 mg KOH/g of nonvolatile resin, more preferably 110 to 170 mgKOH/g. Preferably the polyester has a number average molecular weight of 600 to 4000, more preferably 600 to 2000.

The polyester can be made by conventional means. Generally the components of the polyester are melted together or dissolved in a suitable solvent. The melt or solution is then heated so as to remove the water produced in the reaction between the acid and the hydroxyl groups. When the components are dissolved in a solvent the water can conveniently be removed by azeotropic distillation using a Dean and Stark apparatus.

A particularly preferred type of hydroxyl functional polymer is the reaction product of a polyfunctional carboxylic acid and a monoepoxide, and so has secondary hydroxyl groups arising from the reaction of the acid groups on the polycarboxylic acid with the epoxy group on the monoepoxide.

Preferred monoepoxides are glycidyl esters of C2–C20 alkanoic acids, preferably C8–C9 tertiary carboxylic acids such as versatic acid. One particularly suitable monoepoxide is Cardura E10™.

The polyfunctional carboxylic acid can be a polyester with two or more carboxylic acid groups, preferably two to four carboxylic acid groups, more preferably two or three such groups. Polyesters are compounds containing more than one ester group. Acid functional polyesters can be made by conventional methods from a mixture of polyols, diacids and anhydrides. One preferred acid functional polyester can be made by reaction of a polyol with a carboxylic acid anhydride. Polyols are compounds with more than one hydroxyl group. Preferably the polyol has from two to four hydroxyl groups per molecule and more preferably it is a diol or a triol, diols being particularly preferred. Preferably the polyol has a molecular weight of 66 to 150. Examples of suitable polyols are ethylene glycol, propylene glycol, neopentyl glycol, hexane-1,6-diol, glycerol, trimethylol propane and pentaerythritol. Preferred anhydrides are cyclic internal anhydrides of dicarboxylic acids such as maleic anhydride, succinic anhydride, phthalic anhydride and hexahydroxyphthalic anhydride.

Preferably the reaction between the anhydride and the polyol is carried out substantially stoichiometrically so that one anhydride molecule reacts with each hydroxyl group on the polyol. The resulting polyfunctional acid compound has substantially the same number of acid groups as the polyol had hydroxyl groups. Because the hydroxyl/anhydride reaction occurs at a lower temperature than the carboxyl/hydroxyl or transesterification reactions, there are few side reactions and the molecular weight of the product can be controlled.

The reaction between the polyol and the anhydride can be carried out by dissolving the components in an organic solvent and then heating the solution preferably to between about 100 and 130° C. for between about 1 and 3 hours so as to produce the polyfunctional carboxylic acid.

The reaction between the polyfunctional carboxylic acid and the monoepoxide can be carried out by adding the monoepoxide to a solution of the polycarboxylic acid in a suitable organic solvent in an amount so as to react each of the hydroxyl groups on the polyol with an epoxide group, and heating the mixture to between about 130 and 160° C. for between about 2 and 12 hours.

The compositions can also contain reactive diluents such as aldimines and ketimines, which are compounds having groups of formula (I)

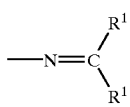

Formula (I)

in which $R^1$ and $R^2$ are independently H, alkyl, cycloaliphatic or substituted alkyl, aryl or cycloaliphatic group.

Preferred ketimines and aldimines are obtained by reaction of a polyamine with an aldehyde or ketone. Examples of aldehydes and ketones suitable for use in making the aldimines and ketimines are those containing 1 to 8 carbon atoms such as propionaldehyde, butyraldehyde, isobutyraldehyde, acetone, methyl ethyl ketone, methyl isobutyl ketone, diisopropyl ketone, cyclopentanone and cyclohexanone.

The polyamine is a compound with two or more amine groups per molecule, preferably a diamine. Preferred diamines, having two amine groups, are aliphatic and cycloaliphatic diamines. Also useful are polyamines containing three or more primary amine groups.

One particularly preferred aldimine is Desmophen TPLS 2142™ from Bayer and one particularly preferred ketimine is VPLS 2965™ from Bayer.

The compositions can also contain catalysts for the isocyanate-hydroxyl reaction. Suitable catalysts include tin catalysts such as dibutyl tin dilaurate and amine catalysts such as triethylamine. The compositions can also contain other conventional paint additives such as, pigments, fillers, UV absorbers and flow aids.

The compositions can be made by dissolving the components in the organic solvent in any order. Generally, when the crosslinker is an unblocked polyisocyanate then the composition is preferably made by adding the polyisocyanate to the other components shortly before use. This avoids problems with the potlife of these compositions.

The coating composition of the invention can be applied to the surface of a substrate and then allowed or caused to dry and cure. According to the present invention there is provided a process for coating a substrate which comprises the steps of applying a layer of a coating composition according to the present invention to a surface of the substrate and thereafter causing or allowing the layer to cure.

The coating composition can be applied by conventional means such as by brush, roller or spray, preferably spray. The substrate can be for example, metal, plastic, wood or glass. The compositions are particularly useful for refinishing motor vehicles and especially as primers.

The applied layer can be allowed to cure at ambient temperature in the case where the hydroxyl polymer and crosslinker react together at ambient temperatures. Alternatively the layer can be baked at elevated temperatures, for example 50–120° C. to accelerate curing. Drying and curing typically takes between 5 minutes and 24 hours depending on the ambient conditions and on the particular components used. Conveniently it takes about 15 minutes to about 5 hours.

According to the present invention there is also provided a coated article obtainable by the process.

The invention will now be illustrated by means of the following examples. The material P210-510™ used in the examples contains the isocyanate trimer of hexamethylene diisocyanate, The MDI used in the examples was Suprasec DNR from ICI Polyurethanes.

EXAMPLES

Three polyurethane primer compositions made using commercially available components from ICI Autocolor, UK. The compositions comprised a hydroxyl functional polymer in a pigmented paint pack (P565-480™), an aliphatic polyisocyanate crosslinker in a hardener pack (P210-512) and a ketimimine reactive diluent in an activator pack (P275-392™) to which was added various levels of MDI. The compositions comprised the following components (in parts by weight);

| Composition | P565-480 | P210-512 | P275-392 | MDI |
|---|---|---|---|---|
| 1 | 100 | 28.2 | 14.3 | 4.4 |
| 2 | 100 | 28.2 | 14.3 | 2.2 |
| 3 | 100 | 28.2 | 14.3 | 0 |

Compositions were mixed in the above order immediately prior to application.

The coatings were applied with SATA jet/B-NR 95/HVLP spray gun to steel substrate, pre-scuffed with P320 sanding paper and degreased with cleaning solvent, in two coats to a dried film thickness of 100 micrometers. The coatings were cured at 60° C. for 30 minutes, allowed to cool for 10 minutes and then flatted using an orbital sander using P360 sanding paper.

In order to test the effect on chipping resistance around the edge of the primer coating on flatting, a spot was flatted to the metal substrate. The appearance of the flatted primer at the edge around the spot of exposed metal substrate was noted.

| Results on flatting | |
|---|---|
| Composition | Appearance of edge |
| 1 | Featheredge (no chipping; primer coating appears to diffuse into the substrate at the edge). |
| 2 | Featheredge |
| 3 | Chipped |

These results clearly show that the presence of MDI significantly improves the sanding of these primers.

What is claimed is:

1. A coating composition comprising: a solution of
   i) a polyisocyanate, and
   ii) a hydroxyl functional polymer,
   the polyisocyanate comprising a mixture of an aliphatic polyisocyanate having an average isocyanate functionality of 2.5 or more, and diphenylmethane diisocyanate; and
   iii) an organic solvent.

2. A composition as claimed in claim 1 in which the polyisocyanate comprises 1 to 99% by weight of diphenylmethane diisocyanate.

3. A composition as claimed in claim 1, in which the ratio of the isocyanate groups on the polyisocyanate to the total number of hydroxyl groups on the hydroxyl functional polymer is in the range of 0.7:1 to 3:1.

4. A composition as claimed in claim 1 in which the hydroxyl functional polymer is a polyester or an acrylic addition polymer.

5. A composition as claimed in claim 4 in which the hydroxyl functional polymer is an acrylic addition polymer.

6. A composition as claimed in claim 5 in which the hydroxyl functional polymer has a number average molecular weight of 700 to 10000.

7. A composition as claimed in claim 5 in which the hydroxyl functional polymer has a hydroxyl value of 5 to 500.

8. A composition as claimed in claim 5 in which the hydroxyl functional polymer has a glass transition temperature of 0 to 80° C.

9. A composition as claimed in claim 4 in which the hydroxyl functional polymer is a polyester polymer.

10. A composition as claimed in claim 9 in which the hydroxyl functional polymer has a number average molecular weight of 600 to 4000.

11. A composition as claimed in claim 9 in which the hydroxyl functional polymer has a hydroxyl value of 50 to 300.

12. A composition as claimed in claim 1 in which the hydroxyl functional polymer is the reaction product of a polyfunctional carboxylic acid and a monoepoxide.

13. A composition as claimed in claim 1 further comprising a ketimine.

14. A process for preparing a coating composition comprising the step of mixing:
   i) a polyisocyanate, and
   ii) a hydroxyl functional polymer,
   the polyisocyanate comprising a mixture of an aliphatic polyisocyanate having an average isocyanate functionality of 2.5 or more, and diphenylmethane diisocyanate.

15. A process for coating a substrate comprising the steps of applying a layer of a coating composition to a surface of the substrate comprising a solution of
   i) a polyisocyanate, and
   ii) a hydroxyl functional polymer,
   the polyisocyanate comprising a mixture of an aliphatic polyisocyanate having an average isocyanate functionality of 2.5 or more, and diphenylmethane diisocyanate; and
   iii) an organic solvent;
and thereafter causing or allowing the layer to cure.

16. A coated substrate formed according to the process of claim 15.

17. A composition as claimed in claim 1 further comprising an aldimine reactive diluent.

* * * * *